United States Patent Office 3,580,895
Patented May 25, 1971

3,580,895
PRODUCTION OF COPOLYMERS IN THE PRESENCE OF AN ORGANOLITHIUM COMPOUND AND AN ORTHOESTER
Akira Onishi, Shiro Anzai, Koichi Irako, Ryota Fujio, Yoshihiro Hayakawa, and Shoji Miyamoto, Tokyo, Japan, assignors to Bridgestone Tire Company Limited, Tokyo, Japan
No Drawing. Filed Dec. 3, 1968, Ser. No. 780,898
Claims priority, application Japan, Dec. 11, 1967, 42/79,057
Int. Cl. C08f 19/08; C08d 3/02
U.S. Cl. 260—83.7     21 Claims

ABSTRACT OF THE DISCLOSURE

Random copolymer is prepared by copolymerizing a conjugated diene, such as 1,3-butadiene and a vinyl-substituted aromatic hydrocarbon, such as styrene at a temperature of −80° to 150° C. in the presence of a substantially anhydrous liquid hydrocarbon by means of a catalyst system consisting essentially of an organolithium compound and an orthoester having the general formula

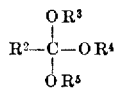

wherein, $R^2$ is hydrogen or a hydrocarbon radical and $R^3$, $R^4$ and $R^5$ are hydrocarbon radicals.

---

The present invention relates to a method of producing conjugated diene polymers by means of a novel catalyst system and more particularly, a method of producing copolymers of a conjugated diene and a vinyl-substituted aromatic hydrocarbon by contacting a mixture of a conjugated diene and a vinyl-substituted aromatic hydrocarbon with two component catalyst consisting of an organolithium compound and an orthoester.

Furthermore, the present invention provides a method of producing copolymers of 1,3-butadiene and a vinyl-substituted aromatic hydrocarbon having a comparatively high vinyl content.

Moreover, the present invention provides a method of producing a copolymer having the random distribution of sequences of a conjugated diene and a vinyl-substituted aromatic hydrocarbon.

In general, when a conjugated diene and a vinyl-substituted aromatic hydrocarbon are copolymerized, the resulting copolymer is classified according to the difference of the distribution of the sequences into a random copolymer, an alternate copolymer, a block copolymer, a graft copolymer and a polymer blend and these copolymers are remarkably different in the property with each other. Namely, this fact shows that the distribution of the sequences in the copolymers is an important structural factor having influence on the physical property.

In the present invention, a copolymer, wherein the distribution of sequences of the same monomer units in a chain of a copolymer is random, is referred to as a random copolymer, while a copolymer, wherein said distribution localizes, is referred to as a block coploymer. When a ratio of concentration of both fed monomers is equal to the composition of every copolymer, which is taken out in any process during the copolymerization reaction, irrespective of the polymerization conversion, namely, when any portion taken out from the chain of copolymer equals to the composition of the fed monomers, such a copolymer is referred to as a completely random copolymer.

In radical copolymerization, a random copolymer is formed generally according to Mayo-Lewis equation, while in ionic copoylmerization, a block copolymer is liable to be formed based on the catalyst regulation. When a mixture of 1,3-butadiene and styrene is copolymerized by means of an organolithium compound in a hydrocarbon solvent, the reactivities of both the monomers are considerably different and as the copolymerization proceeds, 1,3-butadiene having a higher reactivity in the copolymerization is firstly consumed, and then styrene having a poor reactivity is mainly polymerized to produce a block copolymer having a localized distribution of sequences. However, the block copolymer has been used for a special application due to the physical property resulting from the structure, but is not preferable as polymer for producing tires. Therefore, as such a polymer, for example, a random copolymer of 1,3-butadiene and styrene is demanded.

For example, 1,3-butadiene unit in the copolymer obtained by using a single component catalyst of organolithium compound has about 10% of vinyl structure, but in order to improve the processability and hardening velocity it has been attempted to increase a ratio of vinyl structure to a certain extent within a range of molecular weight of rubbery state.

For the purpose of obtaining these copolymers, a number of investigations have been heretofore made in the copolymerization using organolithium compound. As the preferable means, the following processes for varying reactivity of copolymerization of a conjugated diene and a vinyl-substituted aromatic hydrocarbon against organolithium compound by using various randomizers, have been proposed. Namely, (1) Use of ether, thioether, cyclic ether or tertiary amine, such as diethyl ether, tetrahydrofuran, triethylamine.
(2) Use of hexamethylphosphorotriamide.
(3) Use of difunctional Lewis base, such as tetramethylethylenediamine.
(4) Use of organic potassium or sodium compound, such as, potassium-tert-butoxide.

However, these processes include various problems. Namely, (1) In some process, it is required to use such a large amount of randomizers that they are used for a solvent and even when the polymerization solution is used as such, an expensive randomizer is used in a large amount, therefore, this process is not economical.
(2) In some process, the polymerization activity of catalyst is insufficient.
(3) In some process, the catalyst system, wherein a randomizer is mixed with an organolithium compound or the polymerization system thereof is not homogeneous and the activity of catalyst is instantaneously lost only by mixing them and the active catalyst may be formed only in the presence of monomers. These facts result in decrease of the stability and reproducibility of polymerization.
(4) In some process, an influence of such a catalyst on the reactivity of both monomers in copolymerization is weak and the random effect in sequence distribution is insufficient and consequently in the completion of the copolymerization, completely random copolymer cannot be obtained.
(5) In some process, for example, the microstructure of butadiene unit in the resulting copolymer is too large in the vinyl content and reaches often 70% or more (butadiene unit being 100%).
(6) In some process, the polymerization activity is poor or the random effect in copolymerization is not satisfactory and therefore, it is necessary to recover unreacted monomers and the boiling point of the catalyst component is low, so that they are distilled off together with solvent to be recovered and the solvent is liable to be contaminated and consequently, the recovery and purification of monomers and solvent need a high cost.

The present invention is different from the above described known processes and is based on a discovery of novel catalyst system to be used for production of copolymer of a conjugated diene and a vinyl-substituted aromatic hydrocarbon. This catalyst system is homogeneous and stable under a broad preparation condition and therefore, such a catalyst system shows an improved reproducibility of polymerization, has an excellent polymerization activity in a very small amount and gives a noticeable variation in the reactivity of both monomers in the copolymerization, so that the resulting copolymer shows completely random structure and if necessary, a proper blockness can be provided. Furthermore, the vinyl structure of the conjugated diene unit, for example, butadiene unit in the copolymer can be controlled properly within a broad range and further, the recovery and purification of solvent after the polymerization are very easy.

The catalyst to be used in the present invention consists of two components of an organolithium compound and an orthoester. The orthoester is included in a trivalent oxygen-functional organic compound (referring to the definition of Karrer), which has been heretofore recognized that it has de-activating effect for organolithium compound. This is an ester of an orthoacid which has a configuration of carboxylic acid hydrate and this compound has been known as a compound showing a particular reactivity as mentioned by Post and Rodd. It has been well-known that the usual carboxylic acid ester reacts easily with an organolithium compound even under any usual condition and the polymerization activity is completely lost. The orthoester is particular but shows the similar behavior to carboxylic acid ester in various points. For example, if such an ester is mixed with an organolithium compound under a severe condition, said ester reacts with the organolithium compound to de-activate it completely. From this phenomenon it can be considered that on the contrary, if a mild condition is selected, it might be possible to form an effective chelate or complex with an organolithium compound in a very small amount, namely, in a catalytic amount and consequently, such a possibility has been checked and it has been found that in the polymerization process of the present invention as mentioned hereinafter, a very small amount of ean orthoester acts as an excellent activating agent for an organolithium compound, for example, said orthoester provides a polymerization activity of several times and in some cases, several ten times the activity of the n-butyllithium sole system and even under a condition, wherein the polymerization is not caused at all by using n-butyllithium sole system, a sufficient polymerization activity is maintained. Furthermore, the orthoester shows extremely excellent activity as compared with well-known diethyl ether, tetrahydrofuran, thioether, triethylamine, etc. This means that the polymerization completes easily in a sort time and therefore, it is substantially not necessary to recover monomers.

If this orthoester is checked with respect to hydrolysis, a hydrolysis constant of, for example, triethyl orthoacetate, at 25° C. in the presence of an acid is as follows:

$$K = 2.1 \times 10^4 \; l. \cdot mole^{-1} \cdot sec.^{-1}$$

While the hydrolysis constant of an ether, which has been well-known to be difficult in hydrolysis, for example, diethyl ether is as follows:

$$K = 2.4 \times 10^{-13} \; l. \cdot mole^{-1} \cdot sec.^{-1}$$

As seen from the above comparison, the orthoester is easily hydrolyzed under proper condition and therefore, this orthoester is easily removed from the polymer. Furthermore, the orthoester is inherently rich in the reactivity and has generally a high boiling point and further usually it is used only in a catalytic amount, so that it is very easy to prevent contamination of solvent in the recovery of solven and consequently, it is not necessary to do a complicated purification of solvent.

According to the present invention, the stability of the catalyst is excellent in a polymerization temperature from a low temperature to a high temperature and the catalyst is not deactivated until the polymerization is completed. The catalyst system prepared by previously aging the two components, a reaction system wherein to such an aged catalyst are added monomers or a reaction system wherein to monomers and solvent are added two components of the catalyst, is completely homogeneous and therefore the operation is easy, the reproducibility is excellent and the separation of the catalyst from the copolymer can be readily effected.

Furthermore, in this process the content of vinyl structure of the resulting polymer can be controlled over a wide range of 15 to 70%. In the copolymerization the random copolymerization proceeds readily until the completion of copolymerization, so that the distribution of composition of, for example, 1,3-butadiene and vinyl-substituted aromatic hydrocarbon is rich in randomness as shown in the following examples and it is easy to obtain a copolymer having a structure near a complete randomness as mentioned above. This improved randomness in the copolymer is a favourable factor to various physical properties. Moreover, if necessary, the blockness can be introduced into the polymer sequence.

Presumably, the above described various characteristics of the polymerization process and the copolymer are based on the function of the catalyst system to be used in the present invention, particularly, one component of the catalyst system of an orthoester having the general formula

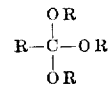

As mentioned above, usual carboxylic acid esters have no effect and the inventors have recognized that, for example, an orthothioester having the general formula

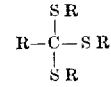

and acetal or ketal having the general formula

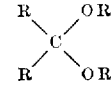

have substantially no activity. From these facts, the particular function of the orthoester is actually surprising.

In short, the process for producing the polymer of the present invention consists in that a mixture of a conjugated diene and a vinyl-substituted aromatic hydrocarbon is contacted with two component catalysts consisting of (1) an organolithium compound and (2) an orthoester in the reaction zone, usually in a liquid solvent at an appropriate temperature under a pressure.

The monomers to be used in the polymerization process of the present invention are a mixture of a conjugated diene and a vinyl-substituted aromatic hydrocarbon.

The conjugated diene has 4 to 12 carbon atoms and includes, for example, 1,3-butadiene, isoprene, 2,3-dimethyl-1,3-butadiene, 2-methyl-1,3-pentadiene, 2,3-dimethyl-1,3-pentadiene, 2 - methyl-3-ethyl-1,3-pentadiene, 2-phenyl-butadiene and the like. Particularly, 1,3-butadiene and isoprene are most preferable.

The vinyl-substituted aromatic hydrocarbons are compounds, wherein at least one vinyl group is attached to carbon atom of aromatic nucleus, and include styrene, 1-vinylnaphthalene, 3 - vinyltoluene, divinylbenzene, etc. Among them styrene is most preferable. As the other examples, mention may be made of 3,5-diethylstyrene, 4-n-propylstyrene, 2,4,6-trimethylstyrene, 4-phenylstyrene, 4-p-tolylstyrene, 3,5 - diphenylstyrene, 3 - ethyl-1-vinylnaphthalene, 8-phenyl-1-vinylnaphthalene and the like.

The particularly preferable combination of the conjugated diene and the vinyl-substituted aromatic hydrocarbon are butadiene-styrene and isoprene-styrene.

The organolithium compounds to be used as the first component of the catalyst of the present invention can be shown by the following formula:

$$R^1(Li)_x$$

In the formula, $R^1$ is an alkyl, an alkenyl, a cycloalkyl, an aryl, and an alkaryl or an aralkyl group having 1 to 30 carbon atoms and $x$ is an integer of 1 to 4. The organolithium compounds are, for example, methyllithium, ethyllithium, n-propyllithium, isopropyllithium, n-butyllithium, isobutyllithium, sec-butyllithium, tert-butyllithium, n-pentyllithium, isopentyllithium, n-hexyllithium, 2-ethyl-hexyllithium, n-octyllithium, n-decyllithium, etc.; allyllithium, cis-propenyllithium, isobutenyllithium, etc.; 1-cyclohexenyllithium, cyclopentyllithium, cyclohexyllithium, cyclohexylethyllithium, etc., phenyllithium, naphthyllithium, etc.; tolyllithium, butylphenyllithium, ethylnaphthyllithium, etc.; benzyllithium, phenylbutyllithium, etc.; tetramethylenedilithium, pentamethylenedilithium, hexamethylenedilithium, diphenylethylenedilithium, 1,3-dilithiumbenzene, 1,3-dilithiumnaphthalene, 1,5 - dilithiumnaphthalene, tetraphenylethylenedilithium and the like. Moreover, the organolithium compounds containing functional groups inert to the polymerization can be used and further, the organolithium compounds having a high molecular weight hydrocarbon residue can be used. The first component of the catalyst is preferably alkyllithiums, the alkyl group of which has 2 to 8 carbon atoms and among them n-butyllithium is most preferable. The organolithium compounds may be used in a mixture of two or more organolithium compounds.

As the second component of the catalyst in the present invention, orthoesters having the general formula can be used.

$$R^2-\underset{\underset{OR^5}{|}}{\overset{\overset{OR^3}{|}}{C}}-OR^4$$

These orthoesters are esters of monobasic carboxylic acids having the general formula $R^2COOH$. Namely, aliphatic monocarboxylic acids, alicyclic monocarboxylic acids, or aromatic monocarboxylic aids. Accordingly, $R^2$ in the above formula is hydrogen, an alkyl, and alkenyl, a cycloalkyl, an aryl, an alkaryl or an aralkyl group having 1 to 20 carbon atoms.

The preferable $R^2$ group is hydrogen; methyl, ethyl, n-propyl, isopropyl, n-butyl, isobutyl, tert-butyl, n-pentyl, n-hexyl group, etc.; vinyl, allyl, isobutenyl group, etc.; 1-cyclohexenyl, cyclopentyl, cyclohexyl, cyclohexylethyl group, etc.; phenyl, naphthyl group, etc.; tolyl, butylphenyl, ethylnaphthyl group, etc.; benzyl, phenylbutyl group, etc. The groups $R^3$, $R^4$ and $R^5$ in the ester portion of the formula are alkyl, alkenyl or aralkyl groups having 1 to 20 carbon atoms, and usually, hydrocarbon residues having 1 to 10 carbon atoms are preferable. The preferable examples of the groups $R^3$, $R^4$ and $R^5$ are methyl, ethyl, n-propyl, isopropyl, n-butyl, isobutyl, tert-butyl, n-pentyl, n-hexyl, n-decyl, isodecyl groups, etc.; vinyl, allyl, isobutenyl groups, etc. As the second component of the catalyst the orthoesters, wherein $R^2$ is hydrogen, an alkyl group having 1 to 6 carbon atoms, phenyl group or benzyl group and $R^3$, $R^4$ and $R^5$ are alkyl groups having 1 to 10 carbon atoms, are preferable. Among them, particularly preferable orthoesters are trimethyl orthoformate, triethyl orthoformate, tri-n-propyl orthoformate, triisopropyl orthoformate, tri-n-butyl orthoformate, triisobutyl orthoformate, tri-tert-butyl orthoformate, tri-n-pentyl orthoformate, tri-n-hexyl orthoformate, tri-n-decyl orthoformate, triisodecyl orthoformate, trimethyl orthoacetate, triethyl orthoacetate, tri-n-propyl orthoacetate, tri-n-butyl orthoacetate, triisobutyl orthoacetate, tri-n-decyl orthoacetate, trimethyl orthopropionate, triethyl orthopropionate, tri-n-butyl orthopropionate, triisobutyl orthopropionate, trimethyl orthobutyrate, triethyl orthobutyrate, trimethyl orthoisobutyrate, triethyl orthoisobutyrate, trimethyl orthotrimethylacetate, triethyl orthotrimethylacetate, trimethyl ortho-n-valerate, triethyl ortho-n-valerate, trimethyl orthobenzoate, triethyl orthobenzoate, trimethyl orthophenylacetate and triethyl orthophenylacetate.

The above described orthoesters may be used in a mixture of two or more compounds. The compounds having a similar structure to this formula are also effective, but the compounds having the following formulae

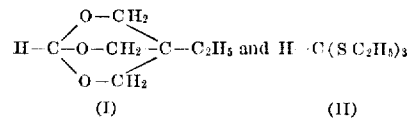

have no activity and therefore, the compounds having a configuration, wherein the groups $R^3$, $R^4$ and $R^5$ of the above described orthoester are combined such as (I), or the sulfur compounds such as (II) are excluded from the scope of the present invention.

The preferable combination of the organolithium compound and the orthoester is as follows:

n-butyllithium-trimethyl orthoformate
n-butyllithium-triethyl orthoformate
n-butyllithium-triethyl orthoacetate
n-butyllithium-triethyl orthopropionate
n-butyllithium-triethyl orthobutyrate
n-butyllithium-triethyl orthovalerate
n-butyllithium-triethyl orthobenzoate
n-butyllithium-triethyl orthophenylacetate
n-butyllithium-tri-n-butyl orthoformate
n-butyllithium-triphentyl orthoformate
n-butyllithium-tridecyl orthoformate
n-butyllithium-trimethyl orthoacetate
phenyllithium-triethyl orthoacetate
and
tetraphenylethylenedilithium-triethyl orthoacetate.

It has been well-known that when the organolithium compound of the first component of the catalyst system of the present invention is used alone, the polymerization velocity increases and the molecular weight of the copolymer decreases, as the amount of the organolithium compound increases.

In the catalyst system of the present invention, in which the organolithium compound is added with the second catalyst component, this tendency is not lost and consequently, the amount is varied within a wide range depending upon the polymerization object and the polymerization process, but when a high molecular weight polymer is desired, the amount of organolithium compound is 0.01 to 10 mmole per mole of the total monomers.

According to the present invention, the catalyst is formed by mixing at least one organolithium compound and at least one orthoester and an amount of the orthoester to form an effective catalyst is usually 0.01 to 100 mmole per mole of monomers, preferably, 0.05 to 50 mmole and the mole ratio of orthoester to organolithium compound is not particularly limited, but the mole ratio suitable for activating the organolithium compound and for obtaining random copolymer is 0.01 to 20, preferably, 0.02 to 10. It is possible to vary the content of vinyl structure in butadiene unit and randomness of the copolymer, while maintaining the high activity by varying the mole ratio, but it is substantially not valuable to adopt an amount exceeding a certain mole ratio.

The polymerization process of the present invention may be effected by a bulk polymerization, but in general, a solution polymerization in an inert solvent is preferable. As the solvent, substantially anhydrous liquid hydrocarbons having less than 20 carbon atoms are used. The solvent involves propane, butane, pentane, hexane, heptane, isooctane, cyclopentane, cyclohexane, decane, hexadecane, benzene, toluene, ethylbenzene, xylenes, naphthalene, tetrahydronaphthalene, etc.

In order to obtain more complete random copolymer, aliphatic or alicyclic hydrocarbons are preferable. Of course, these solvents may be used in a mixture of two or more solvents. An amount of solvent to be used in copolymerization is determined according to the desired molecular weight of the copolymer, the kind of solvent and the like, but the amount ranges usually 100 to 2,000 parts by weight based on 100 parts by weight of the monomers, preferably, 300 to 1,000 parts by weight and if necessary, the solvent may be supplemented during the polymerization reaction to maintain a proper concentration of the copolymer.

In general, it is preferable to remove water, oxygen, carbon dioxide and other catalyst poisons from all substances concerning the polymerization step, such as, catalyst components, solvent, monomers and the like and it is preferable to effect the polymerization reaction in an inert gaseous atmosphere, such as, dried nitrogen or argon.

The process of the present invention can be carried out either in a batch system or a continuous system by using a proper process for adding the starting materials. Various addition processes can be effected. Namely, the first and second components of the catalyst, solvent and monomers may be introduced simultaneously into a reactor or the two catalyst components may be added separately before or after solvent and monomers are charged. Alternatively, the previously aged and prepared catalyst may be added to a mixture of solvent and monomers. The orthoesters of the second component of the catalyst are sufficient in a very small amount and the orthoester forms an effective catalyst with the organolithium compound rapidly even in a fairly diluted state, so that a time necessary for forming the catalyst is short. The orthoesters are usually liquid, therefore, they can be easily used as such, but it is possible to use the orthoester by dissolving in a liquid solvent for the polymerization, liquid monomers or the mixture thereof. Furthermore, it is involved in the present invention that the two components of the catalyst are previously mixed and aged in a liquid hydrocarbon, preferably, a solvent to be used for the polymerization.

When an orthoester and an organolithium compound, for example, triethyl orthoacetate nad n-butyllithium are mixed and treated at 100° C. for 60 minutes, formation of n-butane is observed and a reaction occurs apparently between both components and polymerization activity is substantially lost. However, a catalyst prepared under a mild aging condition usually carried out, for example, prepared by mixing both catalyst components and leaving to stand at room temperature or treating at 50° C. for 30 minutes, is stable and forms a highly effective and uniform catalyst. Accordingly, in the preparation of the catalyst, it is preferable to avoid a severe treatment and to use a mild aging condition. However, as seen from the fact that the catalyst shows a surprising activity even in a polymerization at a high temperature, the two component catalyst after they are contacted with monomers is not deactivated under a severe condition.

This process can carry out the polymerization continuously by maintaining the concentration of reactants in the reactor properly for an appropriate resident time by the above described various addition processes. The polymerization time in a batch system is not particularly limited, but the polymerization is substantially completed within 20 hours, usually, within 5 hours.

In a continuous system, the resident time varies widely according to the condition, but it is generally from several minutes to about 2 hours under a condition of particular range.

According to the present invention, the copolymerization can be effected at a temperature within a range of —80 to 150° C., but in general it is preferable to effect the copolymerization within a range of 0 to 100° C. Moreover, it is within the scope of the present invention that in a batch system the temperature is raised continuously or in a multi-stage and that in a continuous system the temperature is raised at the terminal stage of copolymerization. The polymerization reaction can be effected under a pressure generated spontaneously, but usually it is preferable to effect the polymerization under a sufficient pressure to retain the monomers in a substantially liquid state.

In general, the pressure depends upon monomers to be copolymerized, solvent, polymerization temperature and the like.

After the polymerization is completed or a desired molecular weight is attained, it is possible to recover the copolymer by effecting usual operations for preventing oxidation, deactivating the catalyst, separating and recovering the copolymer and the like. Namely the polymerization solution is added with an antioxidant and then added with a non-solvent, such as, methyl alcohol, isopropyl alcohol, water, etc., whereby the catalyst can be deactivated and the copolymer can be recovered. Alternatively, the polymerization solution added with an antioxidant is poured into a heated non-solvent to distill off the solvent or in some case, to distill off a mixture of the solvent and the unreacted monomers, whereby the copolymer can be separated. Furthermore, since the amount of the catalyst is sufficient in a very small amount, the catalyst is generally a compound having a high boiling point, the copolymerization can be readily completed and in many cases it is only necessary to take removal of an aliphatic hydrocarbon having a low boling point which is frequently used as a preferable solvent, for example, n-hexane, mainly into consideration, the solvent can be removed and at the same time, the dried copolymer can be obtained by adding to the polymerization solution an antioxidant, such as, phenyl-$\beta$-naphthylamine and if necessary, a small amount of an agent for deactivating the catalyst and then directly heating this solution, if necessary, under a reduced pressure. The catalyst is sufficient in a small amount, so that in many cases, even if such a catalyst remains in the copolymer, the physical property is not affected adversely at all. But when the catalyst residue should be decreased to a low level, such an object can be easily attained by contacting the reaction solution with a large amount of proper non-solvent efficiently, because the catalyst system itself is a homogeneous system, or treating with water or hot water containing a slight amount of acid, if necessary, because, the orthoester of the second component is readily hydrolyzed. Of course, in order to purify the copolymer, a precipitation process may be used.

The copolymer obtained by copolymerization of a conjugated diene and a vinyl-substituted aromatic hydrocarbon in the presence of the two component catalyst system can be obtained as any composition of 1 to 99% by weight of conjugated diene and 99 to 1% by weight of vinyl-substituted aromatic hydrocarbon, but from the using object of the copolymer, when the copolymer is used as rubber, a composition containing 50 to 95% by weight of conjugated diene (vinyl-substituted aromatic hydrocarbon being 5 to 50% by weight) is useful and when the copolymer is used as a resin, a copolymer containing 70 to 98% by weight of vinyl-substituted aromatic hydrocarbon (conjugate diene being 2 to 30% by weight) is preferable. Since the formation of random copolymer is due to the essential function of the novel catalyst of the present invention, the random copolymer can be naturally obtained under the above described broad polymerization conditions. However, in some case it is required to disturb the randomness of the sequence distribution in view of the using object of copolymer and the physical property. One of the processes for controlling this randomness optionally comprises varying the mole ratio of the second component/the first component of the catalyst or the polymerization temperature. For example, in a copolymer obtained by carrying out the copolymerization of 1,3-butadiene and styrene under a certain condition at 80° C., a part of styrene is arranged in the chain as a comparatively long sequence. Only by introducing a slight blockness in this manner, for example, cold flow can be improved. Furthermore, the ratio of vinyl structure in rubbery or resinous copolymer varies generally depending upon mole ratio of the second component/the first component and the copolymerization temperature. Accordingly, if necessary, the vinyl structure of butadiene unit, for example, in a copolymer of 1,3-butadiene and styrene may be obtained in an amount of 15 to 70% or more, but such a structure is generally within a range of 20 to 60%. According to the copolymerization of the present invention (if the composition of both the monomers is adopted properly), a copolymer of rubbery solid having a high molecular weight and no gel can be easily obtained. The molecular weight is determined by a mole ratio of monomers to organolithium compound. It has been known that when the copolymerization is effected in an aromatic hydrocarbon, such as, toluene in the presence of a catalyst consisting of an organolithium compound and a difunctional Lewis base, a liquid copolymer having a low molecular weight is formed, but according to the present invention, if the amount of an organolithium compound has been adjusted, a chain transfer hardly occurs in an aliphatic hydrocarbon, such as, hexane or in an aromatic hydrocarbon and a copolymer having a high molecular weight can be obtained reproducibly and therefore, it is considered that a growth of polymer chain occurs fundamentally irrespective of solvent according to the generally known "living polymerization" until the monomers are consumed.

It has been recognized that in the copolymerization of, for example, butadiene and vinyl-substituted aromatic hydrocarbon, the glass transition temperature of the copolymer can be controlled by adjusting the composition of copolymer, the randomness of sequence distribution and the vinyl content of butadiene unit and the range is not particularly limited, but in the case of rubbery polymer, the range is −10 to −100° C.

The rubbery copolymer obtained by a proper composition of copolymer can be compounded by a conventional known means utilizing in the case of natural rubber and the like and the randomness of the copolymer is excellent in view of the structure, so that the physical properties of the vulcanized product of the copolymer can be improved in various points as compared with that of the polybutadiene or the block copolymer obtained by one component catalyst of organolithium compound.

This copolymer can be used for production of tires of cars, gasket, container, sheet and the like.

Furthermore, the copolymer containing a high vinyl-substituted aromatic hydrocarbon can be used as resin and, for example, in a copolymer of 1,3-butadiene and styrene, a small amount of butadiene sequence is arranged randomly in the polystyrene sequence, so that impact strength is fairly improved.

In the following examples, all the starting materials to be used are expressed by weight part except the second catalyst component (hereinafter abridged as the second component). The amount of the second component used is expressed by mole ratio based on organolithium compound and, for example, expression "0.5" of the second component means that mole ratio of the second component based on organolithium compound is 0.5. Furthermore, in order to show the total scale of the copolymerization reaction, the amount of organolithium practically used is expressed by mmole and mmole of the total monomers used is expressed by "M."

The invention will be further explained in detail by the following examples:

EXAMPLE 1

An autoclave having a capacity of 25 l., which was provided with a mechanical stirrer, a monomer supplying tank and a thermoregulator was dried thoroughly and then substituted with previously purified nitrogen three times repeatedly and a completely inert gaseous atmosphere was formed.

To this autoclave, 400 parts of n-hexane dried previously by a molecular sieve (water content 5 p.p.m.) and 25 parts of styrene previously dried with silica gel (water content of 38 p.p.m.) were fed and after 5 minutes at 18° C. 0.5 of triethyl orthopropionate was added thereto.

The resulting mixture was cooled to 5° C. and 75 parts of 1,3-butadiene were introduced into the mixture and then 0.10 part of n-butyllithium (40.66 mmole) was added thereto and the mixture was stirred and then the temperature of the polymerization system was adjusted at 40° C. and the polymerization started ($M=40660$).

After continuing the copolymerization for 5 hours, an acetone solution of 2,6-di-tert-p-cresol was added to the polymerization system to stop the copolymerization. The removal of solvent was effected by a conventional steam strip process and the copolymer obtained by drying in vacuo at 50° C. was clear rubbery elastomer. The final conversion to the copolymer was 96.5% and the intrinsic viscosity measured in toluene at 30° C. (the intrinsic viscosity shown hereinafter was measured under the same condition and the unit is 100 ml./g.) was 1.44.

The microstructure of 1,3-butadiene unit and the styrene content of the copolymer were analyzed by using an infrared spectrometer following to the process described hereinafter.

In general, the intensity of infrared spectrum is shown by the following Formula 1 according to Beer's law.

$$I=I_0 e^{-kct} \quad (1)$$

$I$: intensity of infrared ray passed through sample.
$I_0$: intensity of infrared ray before passing through sample.
$k$: extinction coefficient of sample.
$c$: concentration of sample.
$t$: thickness of cell.

With respect to the characteristic absorptions at 700 cm.$^{-1}$ assigned to styrene, 967 cm.$^{-1}$ assigned to trans-1,4 unit in butadiene unit and 910 cm.$^{-1}$ assigned to vinyl unit in butadiene unit, each extinction coefficient of a sample was calculated from standard material by using a Japanese spectrometer 402G diffraction grating type of infrared spectrometer. The Formula I is deformed to obtain the following formula:

$$D = \log I_0/I = kct \quad (2)$$

From the Formula 2, the concentrations of trans-1,4 unit, vinyl unit and styrene can be easily calculated according to the thickness of cell ($t$), the measured value of absorbance (D) and the above described extinction coefficient.

However, the concentration of cis-1,4 unit was calculated by reducing the concentrations of trans-1,4 unit, vinyl unit and styrene from the concentration of the sample.

The microstructure of 1,3-butadiene unit and styrene content described in the present invention are defined as follows:

$$\text{cis-1,4 content (weight percent)} = \frac{Cc}{Ct+Cv+Cc} \times 100$$

$$\text{trans-1,4 content (weight percent)} = \frac{Ct}{Ct+Cv+Cc} \times 100$$

$$\text{vinyl content (weight percent)} = \frac{Cv}{Ct+Cv+Cc} \times 100$$

styrene content (weight percent)

$$= \frac{CsT}{Ct+Cv+Cc+CsT} \times 100$$

$Ct$: concentration of trans-1,4 unit in the copolymer obtained by infrared spectrum analysis.
$Cv$: concentration of vinyl unit in the copolymer obtained by infrared spectrum analysis.
$Cc$: concentration of cis-1,4 unit in the copolymer obtained by infrared spectrum analysis.
$CsT$: concentration of styrene unit in the copolymer obtained by infrared spectrum analysis.

The measurement of infrared spectrum was made in a solution cell containing a cell thickness of 0.5 mm., in which the copolymer is dissolved in carbon disulfide. Furthermore, when using such an analyzing process, the theoretical styrene content in a conversion of 100% in various styrene feeding ratios meets favorably with the measured value.

With respect to the microstructure of polybutadiene, the quantitative analysis was made by using the exactly same measuring process.

The microstructure of the copolymer obtained in this example consisted of 20.1% of cis-1,4 content, 37.5% of trans-1,4 content, 42.4% of vinyl content and 23.7% of styrene content.

Furthermore, as a means for judging randomness of the copolymer obtained by the present invention, the randomness of styrene sequence was measured from a recovering percentage of styrene, which was recovered by an oxidative degradation method as mentioned hereinafter.

The oxidative degradation method was followed to I. M. Kolthoff process using osmium tetraoxide and tert-butyl hydroperoxide (described in Journal of Polymer Science, 1, 429 (1946)). Namely, when the polymer of the present invention is subjected to the oxidative degradation by means of a catalyst of osmium tetraoxide and tert-butyl hydroperoxide, only the butadiene unit is decomposed and the styrene unit is not decomposed and remains. When the thus treated copolymer is added with methanol, styrene sequence having a polymerization degree of less than about 5 is soluble in methanol, while styrene sequence having a polymerization degree of more than about 5 is insoluble in methanol. In this manner, the randomness of the copolymer can be judged from the recovering percentage of the methanol-insoluble sequence.

The term "recovering percentage" used herein means weight percentage of the styrene sequence recovered as the methanol-insoluble par through the oxidative degradation based on the total styrene content in the copolymer prior to the oxidative degradation.

The recovering percentage after the oxidative degradation of the copolymer obtained in the present example is 0 and in the copolymer, there is no long styrene sequence and it can be seen that the copolymer is a random copolymer.

The glass transition temperature of the copolymer of the present example, which is measured by means of scannng differential calorimeter (Parkin Elmer D.S.C.-I type) was −48° C.

As shown in this example, it has been found that clear copolymers having no gel and such a high molecular weight as required for rubber, can be obtained easily in a satisfactorily high activity by using two component catalyst consisting of n-butyllithium and a catalytic amount of triethyl orthopropionate.

EXAMPLE 2

A pressure-proof bottle having a capacity of 100 ml. was sufficiently dried and substituted with previously purified nitrogen three times repeatedly, and then fed with 400 parts of dried n-hexane, 25 parts of styrene and predetermined amounts of the second component of catalyst by means of an injector, and the resulting mixture was cooled to −78° C. and added with 75 parts of 1,3-butadiene (M=100) and further added with 0.73 part (0.7 mmole) of n-butyllithium and then the bottle was capped. The bottle was fixed in a thermobath at 40° C., and then a polymerization was carried out for predetermined periods of time. Thereafter the polymerization reaction was stopped with a large amount of 2% solution of phenyl-β-naphthylamine in methanol, and the precipitated copolymer was separated and dried in vacuo at 50° C. The conversion to the copolymer obtained by the above described method, microstructure and styrene content are shown in the following Table 1.

TABLE 1

| Experiment Number | Second component Kind | Added amount | Polymerization time (minute) | Conversion (percent) | Microstructure, percent Trans-1,4 | Vinyl | Cis-1,4 | Styrene content (percent) |
|---|---|---|---|---|---|---|---|---|
| 1 | Nil | 0 | 60 | 31.6 | 50.7 | 8.7 | 40.6 | 2.6 |
| 2 | Trimethyl orthoformate | 0.17 | 60 | 45.4 | 46.2 | 20.3 | 33.5 | 14.1 |
| 3 | do | 0.50 | 60 | 73.2 | 41.5 | 31.7 | 26.8 | 23.4 |
| 4 | Triethyl orthoformate | 0.17 | 15 | 20.0 | 36.4 | 41.3 | 22.3 | 17.2 |
| 5 | do | 0.50 | 15 | 49.8 | 31.1 | 50.8 | 18.1 | 20.6 |
| 6 | Triethyl orthoacetate | 0.17 | 15 | 87.5 | 23.5 | 60.8 | 15.7 | |
| 7 | do | 0.50 | 15 | 91.5 | 20.8 | 61.6 | 17.5 | |
| 8 | Triethyl orthopropionate | 0.17 | 15 | 42.4 | 33.4 | 48.9 | 17.7 | 19.6 |
| 9 | do | 0.50 | 15 | 84.6 | 27.5 | 55.8 | 16.7 | 23.8 |
| 10 | Triethyl orthobutyrate | 0.17 | 15 | 53.5 | 29.7 | 51.1 | 19.2 | 22.5 |
| 11 | do | 0.50 | 15 | 84.6 | 26.6 | 52.8 | 20.6 | 21.9 |
| 12 | Triethyl orthovalerate | 0.17 | 15 | 70.1 | 28.7 | 52.7 | 18.6 | 23.3 |
| 13 | do | 0.50 | 15 | 81.3 | 26.9 | 52.2 | 20.9 | 23.5 |
| 14 | Triethyl orthobenzoate | 0.17 | 15 | 80.0 | 28.2 | 52.1 | 19.8 | 23.1 |
| 15 | do | 0.50 | 15 | 87.6 | 27.3 | 53.7 | 19.0 | 25.1 |
| 16 | Triethyl orthophenylacetate | 0.50 | 15 | 53.2 | 30.2 | 48.7 | 21.1 | 22.2 |
| 17 | Trimethyl orthoacetate | 0.17 | 60 | 78.0 | 35.1 | 33.8 | 31.1 | 12.4 |
| 18 | do | 0.50 | 60 | 89.1 | 45.3 | 24.6 | 18.7 | 18.7 |
| 19 | Tri-n-butyl orthoformate | 0.17 | 60 | 46.6 | 37.8 | 34.4 | 27.8 | 14.5 |
| 20 | do | 0.50 | 60 | 54.7 | 28.3 | 45.0 | 26.7 | 14.5 |
| 21 | Tripentyl orthoformate | 0.17 | 60 | 55.8 | 38.2 | 39.3 | 22.6 | 19.1 |
| 22 | do | 0.50 | 60 | 76.4 | 32.5 | 43.2 | 24.3 | 23.4 |
| 23 | Tridecyl orthoformate | 0.17 | 60 | 56.6 | 36.4 | 36.1 | 27.3 | 12.2 |

As seen from the above table, the two component catalysts of a combination of n-butyllithium with various orthoesters according to the present invention increase the polymerization activity and styrene content considerably as compared with a single component catalyst of n-butyllithium. This indicates remarkable activating and random effects of the orthoesters as the second components.

EXAMPLE 3

The variation of copolymerization with passage of time was checked with a catalyst system comprising triethyl orthoacetate in the same manner as described in Example 2. The fed amounts were 400 parts of n-hexane, 25 parts of styrene, 0.67 of triethyl orthoacetate, 75 parts of 1,3-butadiene (M=100) and 0.52 part (0.5 mmole) of n- butyllithium and the polymerization temperature was 18° C. The results are shown in the following Table 2.

TABLE 2

| Experiment Number: | Polymerization time (minute) | Conversion (percent) | Microstructure, percent | | | Styrene content (percent) |
|---|---|---|---|---|---|---|
| | | | Trans-1,4 | Vinyl | Cis-1,4 | |
| 1 | 5 | 21.0 | 22.0 | 66.2 | 11.8 | 25.6 |
| 2 | 10 | 30.4 | 20.9 | 66.6 | 12.5 | 29.4 |
| 3 | 15 | 50.2 | 20.7 | 67.5 | 11.8 | 28.6 |
| 4 | 30 | 62.6 | 20.9 | 66.3 | 12.9 | 28.9 |
| 5 | 45 | 74.3 | 19.4 | 62.5 | 18.2 | 27.2 |

EXAMPLE 4

In accordance with the same manner as described in Example 2, the variation of formation of copolymer with passage of time was checked by using 400 parts of n-hexane, 25 parts of styrene, 0.33 of triethyl orthoformate, 75 parts of 1,3-butadiene and 0.73 part (0.7 mmole) of n-butyllithium (M=100) at 40° C. The results are shown in the following Table 3.

TABLE 3

| Experiment Number: | Polymerization time (minute) | Conversion (percent) | Microstructure, percent | | | Styrene content (percent) |
|---|---|---|---|---|---|---|
| | | | Trans-1,4 | Vinyl | Cis-1,4 | |
| 1 | 15 | 35.8 | 33.6 | 46.9 | 19.5 | 21.4 |
| 2 | 30 | 67.3 | 36.4 | 48.6 | 14.9 | 24.5 |
| 3 | 45 | 78.7 | 34.0 | 45.6 | 20.3 | 24.4 |
| 4 | 60 | 93.2 | 35.0 | 47.1 | 17.9 | 24.1 |

It is understood from Examples 3 and 4 that the obtained copolymers are substantially closed to the complete random copolymer as described hereinbefore, namely that the composition of the copolymer taken out in any step during the copolymerization reaction agrees substantially with the composition of the fed monomers irrespective of the conversion.

EXAMPLE 5

A series of polymerization experiments were carried out in the manner described in Example 2 except that the amount of the orthoesters used was varied. In this experiment, the amount of the orthoesters used and polymerization time were varied as shown in the following Table 4.

orthoester is increased fairly, the polymerization reaction is not prevented.

EXAMPLE 6

The polymerization experiment was carried out in the same recipe and manner as described in Example 1 except that the polymerization temperature was 80° C. The polymerization reaction was completed in one hour and the conversion was 100%. The resulting copolymer had an intrinsic viscosity of 1.41, a microstructure consisting of cis-1,4 content of 28.1%, vinyl content of 22.2%, and trans-1,4 content of 49.7%, a styrene content of 24.5%, and a glass transition temperature of −76.5° C.

Furthermore, the recovering percentage of styrene measured by the oxidative degradation method was 43.4% and the copolymer had a fair blockness.

From the comparison with Example 1, it can be seen that is is possible to reduce the vinyl content of the copolymer and introduce the blockness by raising the polymerization temperature.

Moreover, the glass transition temperature of the copolymer in this example is fairly lower than that of the copolymer obtained in Example 1. Thus, by selecting the polymerization temperature properly, the randomness and the vinyl content of butadiene unit can be adjusted and a

TABLE 4

| | Second component | | Polymerization time (minute) | Conversion (percent) | Microstructure, percent | | | Styrene content (percent) |
|---|---|---|---|---|---|---|---|---|
| | Kind | Added amount | | | Trans-1,4 | Vinyl | Cis-1,4 | |
| Experiment number: | | | | | | | | |
| 1 | Nil | 0 | 60 | 23.3 | | | | 2.7 |
| 2 | Triethyl orthoformate | 0.02 | 60 | 39.5 | 47.2 | 23.9 | 28.9 | 6.5 |
| 3 | do | 0.10 | 60 | 57.3 | 40.7 | 33.9 | 25.4 | 16.1 |
| 4 | do | 0.33 | 60 | 79.0 | 19.7 | 44.0 | 36.3 | 21.9 |
| 5 | do | 0.50 | 30 | 63.7 | 32.0 | 45.5 | 22.6 | 22.7 |
| 6 | do | 3.33 | 60 | 90.2 | 27.4 | 55.4 | 17.2 | |
| 7 | do | 6.67 | 60 | 93.2 | 27.3 | 56.1 | 16.5 | |
| 8 | Triethyl orthoacetate | 0.02 | 60 | 45.2 | 36.5 | 29.2 | 34.3 | 13.6 |
| 9 | do | 0.27 | 60 | 94.7 | 23.4 | 52.7 | 23.9 | |
| 10 | do | 1.67 | 60 | 100.0 | 20.9 | 58.0 | 21.1 | |
| 11 | Triethyl orthopropionate | 0.02 | 60 | 31.5 | 46.0 | 19.8 | 34.2 | 8.8 |
| 12 | do | 0.17 | 60 | 70.0 | 35.1 | 39.1 | 25.8 | 21.0 |
| 13 | do | 0.33 | 60 | 91.4 | 32.1 | 32.2 | 35.6 | 25.6 |

The following facts are seen from the results described in the above Table 4. All of the orthoesters described in this example, i.e. triethyl orthoformate, triethyl orthoacetate and triethyl orthopropionate, indicate an activating effect even in an amount of 0.02.

Furthermore, as the amount of the orthoesters used increases the vinyl content as well as the activating effect increases. Thus, by suitably selecting the amount of the orthoester used, it is possible to control the vinyl content.

Moreover, it can be seen that even if the amount of the copolymer having a controlled glass transition temperature can be obtained.

EXAMPLE 7

A series of polymerization experiments was carried out by using 400 parts of n-hexane, 25 parts of styrene, 75 parts of 1,3-butadiene and triethyl orthoacetate as the second component of the catalyst. In this example, the same manner as described in Example 2 was used except that the copolymerization temperature and the amounts of n-butyllithium and triethyl orthoacetate used were varied as shown in the following Table 5 respectively. The results are shown in Table 5.

TABLE 5

| Experiment No. | Amount of triethyl ortho-acetate used | Amount of n-butyl-lithium part (mmole) | Polymerization temperature (° C.) | Polymerization time (minute) | Percent Conversion | Vinyl content | Styrene content | Recovery of styrene |
|---|---|---|---|---|---|---|---|---|
| 1 | 0 | 0.73(0.70) | 0 | 60 | 0 | | | |
| 2 | 0.17 | | 0 | 70 | 21.1 | 67.8 | 28.1 | |
| 3 | 0 | | 18 | 60 | 0 | | | |
| 4 | 0.17 | | 18 | 60 | 58.2 | 67.5 | 27.4 | |
| 5 | 0 | | 30 | 60 | 12.1 | 9.3 | 3.0 | |
| 6 | 0.17 | | 30 | 60 | 88.9 | 58.1 | 28.9 | |
| 7 | 0 | | 80 | 60 | ca.100 | 39.0 | 26.3 | |
| 8 | 0.20 | 0.21(0.65) | 80 | 210 | 96.7 | 25.7 | 25.1 | 22.1 |
| 9 | 0.33 | | 80 | 210 | 94.3 | 31.4 | 24.8 | 18.9 |
| 10 | 0.67 | | 80 | 210 | 96.8 | 40.6 | 26.0 | 0 |
| 11 | 1.67 | | 80 | 210 | 95.8 | 51.3 | 26.8 | 0 |

NOTE.—Experiment Numbers 1–7; M=100; Experiment Numbers 8–11, M=325.3.

As shown in Experiment Nos. 1 to 4, when the polymerization temperature is as low as 0 to 18° C., polymerization cannot start with n-butyllithium alone, but in the catalyst system combined with triethyl orthoacetate is activating effect appears and polymerization proceeds easily. Further, it is aparent from the comparison of Experiment Nos. 2, 4, 6 and 7 that the vinyl content can be controlled by the polymerization temperature.

Furthermore, when the polymerization temperature is 80° C., the vinyl content lowers and the copolymer having a fair blockness is obtained, but even in this case the copolymers of a wide range from a random copolymer to a fairly block copolymer can be produced according to the amount of the orthoester used.

Moreover, from the fact that the catalyst system consisting of the organolithium and the orthoester has the above described randomizing effect at 80° C., it can be seen that the catalyst is stable sufficiently at a high temperature.

EXAMPLE 8

An ampule having a capacity of about 80 ml. was used as a polymerization vessel and it was subjected to heat-drying under vacuum and purging with previously purified gaseous nitrogen alternately three times repeatedly, and then fed with 400 parts of n-hexane, 25 parts of styrene and 0.33 of triethyl orthoacetate by means of an injector and further added with 75 parts of distilled 1,3-butadiene (M=100). 0.07 part (0.07 mmole of n-butyllithium was further introduced into the ampule by means of an injector and the ampule was fused and sealed and left to stand in a thermobath at 40° C. for a period of time shown in the following Table 6 to effect the polymerization. The treatment after the completion of the polymerization reaction was followed to the manner as described in Example 2. The results obtained in this experiment are shown in Table 6.

TABLE 6

| Experiment No. | Polymerization time (minute) | Conversion (percent) | Intrinsic viscosity (100 ml./grams) | Glass transition temperature (° C.) |
|---|---|---|---|---|
| 1 | 40 | 12.8 | 0.83 | |
| 2 | 90 | 45.4 | 1.20 | |
| 3 | 140 | 51.7 | 1.50 | −53 |
| 4 | 190 | 65.0 | 2.02 | |

It can be considered from the data of the above table that even by the catalyst system consisting of n-butyllithium and triethyl orthoacetate, the intrinsic viscosity increases as the conversion increases, and this polymerization is a living polymerization accompanying no termination and chain transfer reaction as observed in the polymerization by means of the one component catalyst of butyllithium.

EXAMPLE 9

A series of experiments was carried out according to the same maner as described in Example 2 by using 400 parts of n-hexane, 0.52 part (0.5 mmole) of n-butyllithium and 0.67 of triethyl orthoacetate and varying feed ratio of styrene and 1,3-butadiene (M=100). The polymerization reaction was stopped after the pressure-proof bottle was rotated in a thermobath at 40° C. for one hour.

TABLE 7

| Experiment Number | Amount of styrene fed part | Amount of butadiene-1,3 fed part | Conversion (percent) | Styrene content (percent) |
|---|---|---|---|---|
| 1 | 5 | 95 | 94.0 | 5.9 |
| 2 | 10 | 90 | 81.0 | 10.5 |
| 3 | 25 | 75 | 96.0 | 27.6 |
| 4 | 50 | 50 | 92.7 | 45.2 |

EXAMPLE 10

The preparation of SBR having a high styrene content was carried out by using 400 parts of n-hexane, 90 parts of styrene, 0.5 of triethyl orthopropionate, 10 parts of 1,3-butadiene and 0.10 part (0.1 mmole) of n-butyllithium (M=100) in the same manner as described in Example 8. The polymerization was effected at 40° C. for 9 hours. The conversion of the obtained resinous copolymer was 83.9% and the intrinsic viscosity was 0.62.

EXAMPLE 11

Four hundred parts of n-hexane, 0.67 of triethyl orthoacetate, 100 parts of 1,3-butadiene (M=100) and 0.52 part of n-butyllithium were fed in the order as described above and a homopolymerization of the butadiene was carried out at 40° C. for 1 hour. For the purpose of comparison, a polymerization was carried out with one component catalyst of n-butyllithium. The results are shown in the following Table 8.

TABLE 8

| Experiment Number | Conversion (percent) | Microstructure, percent | | |
|---|---|---|---|---|
| | | Trans-1,4 | Vinyl | Cis-1,4 |
| 1 | 91.3 | 21.5 | 65.4 | 13.1 |
| 2[1] | 22.7 | 48.2 | 8.2 | 43.6 |

[1] Triethyl orthoacetate is not used.

From the results of this example, the activating effect due to triethyl orthoacetate can be recognized even in the homopolymerization of 1,3-butadiene and it can be seen that the vinyl content of the obtained copolymer is relatively high.

EXAMPLE 12

Four hundred parts of n-hexane, 0.5 of triethyl orthoacetate, 100 parts of 1,3-butadiene (M=100) and 0.10 part (0.1 mmole) of n-butyllithium were fed into an ampule in the order as described above and then the polymerization was carried out at 40° C. for 1 hour in the same manner as described in Example 8. The results of the polymerization were as follows.

Conversion: 67.7%; Trans-1,4: 30.4%; Vinyl: 51.6%; Cis-1,4: 18.0%; Intrinsic viscosity: 1.03.

As shown in this example, 1,3-butadiene polymer having a sufficiently high molecular weight can be produced by applying two component catalysts of the present invention to the homopolymerization of 1,3-butadiene.

EXAMPLE 13

A series of polymerization experiments was carried out at 18° C. in the same manner as described in Example 2 by using 400 parts of toluene, 25 parts of styrene, 75 parts of 1,3-butadiene, 0.52 part (0.5 mmole) of n-butyllithium, and 0.67 of triethyl orthoacetate (M=100). The results are shown in the following Table 9.

intrinsic viscosity was 0.63 and the recovering percentage measured by an oxidative degradation method was 0, so that this elastomer was a random copolymer.

Moreover, it can be seen that a high polymerization reaction can be carried out in a solvent of an aromatic hydrocarbon without hindrance even if the polymerization temperature is raised to 80° C.

EXAMPLE 16

A pressure-proof bottle having a capacity of 100 ml. was precisely dried and substituted with nitrogen three

TABLE 9

| Experiment Number: | Polymerization time, (minute) | Conversion (percent) | Microstructure, percent | | | Styrene content, (percent) |
|---|---|---|---|---|---|---|
| | | | Trans-1,4 | Vinyl | Cis-1,4 | |
| 1 [1] | 45 | 1.6 | 49.6 | 12.3 | 38.0 | 3.5 |
| 2 | 5 | 39.3 | 18.5 | 75.3 | 6.1 | 21.8 |
| 3 | 10 | 55.2 | 17.6 | 69.1 | 13.3 | 21.6 |
| 4 | 15 | 72.2 | 17.8 | 71.7 | 10.5 | 21.0 |
| 5 | 30 | 79.8 | 16.2 | 57.8 | 26.0 | 21.1 |
| 6 | 45 | 100.0 | 18.3 | 69.5 | 12.2 | 25.0 |

[1] Triethyl orthoacetate is not used.

In this example toluene was used as a solvent, but the activating effect of triethyl orthoacetate is recognized as compared with one component catalyst of n-butyllithium and further it is apparent that the obtained polymer is close to a complete random copolymer.

EXAMPLE 14

The polymerization reaction was carried out by using 400 parts of toluene, 25 parts of styrene, 0.5 of triethyl orthoacetate, 75 parts of 1,3-butadiene and 0.10 part (0.1 mmole) of n-butyllithium (M=100) at 40° C. for 23 minutes in the same manner as described in Example 8 by using an ampule as a polymerization vessel.

The conversion to the copolymer was 60.2%, the microstructure was trans-1,4 of 26.3%, vinyl of 53.6% and cis-1,4 of 20.2%, the styrene content was 22.5% and the intrinsic viscosity was 1.14.

As shown in this example, the catalyst system according to the present invention can give substantially a high molecular weight copolymer even if an aromatic hydrocarbon is used as a solvent.

EXAMPLE 15

Four hundred parts of toluene, 25 parts of styrene, 0.67 of triethyl orthoacetate, 75 parts of 1,3-butadiene and 0.21 part (0.65 mmole) of n-butyllithium (M=325.3) were polymerized in a polymerization bottle having a capacity of 300 ml. at 80° C. for 3.5 hours according to the manner as described in Example 2. The conversion was 93.9%.

The microstructure in the obtained rubbery elastomer was trans-1,4 of 24.4%, vinyl of 59.4%, and cis-1,4 of 16.2%, and the styrene content was 27.3%. Further, the times repeatedly, and then fed with 400 parts of n-hexane, 0.73 part (0.7 mmole) of n-butyllithium and 0.5 of triethyl orthoformate to effect aging. The aging conditions are shown in the following Table 10. The catalyst system obtained by the aging was cooled to −78° C. and 75 parts of 1,3-butadiene and 25 parts of styrene (M=100) were fed therein, and then polymerization was effected at 40° C. for one hour.

The results are shown in Table 10.

TABLE 10

| | Aging condition | | Conversion (percent) | Microstructure, percent | | | Styrene content (percent) |
|---|---|---|---|---|---|---|---|
| | Temperature (° C.) | Time (minute) | | Trans-1,4 | Vinyl | Cis-1,4 | |
| Experiment No. | | | | | | | |
| 1 | −78 | 10 | 86.1 | 31.6 | 46.5 | 21.8 | 26.2 |
| 2 | 20 | 30 | 81.5 | 34.2 | 51.2 | 14.6 | 26.3 |
| 3 | 50 | 30 | 86.5 | 30.6 | 44.9 | 24.5 | 23.9 |
| 4 [1] | None | | 95.5 | 29.1 | 44.3 | 26.6 | 25.6 |

[1] n-Hexane, triethyl orthoformate and styrene were previously mixed and 1,3-butadiene was charged thereto under cooling, and then n-butyllithium was added immediately to start polymerization.

As seen from the result of the above table, the catalyst system obtained by aging at 50° C. for 30 minutes and the catalyst system obtained under the other aging condition are not considerably different from the catalyst system wherein the polymerization was carried out by adding n-butyllithium in the presence of monomer. Accordingly, it can be seen that the catalyst system according to the present invention is stable under relatively mild aging conditions, such as 50° C. and 30 minutes, and that even if the catalyst is prepared in the absence of monomer, such a catalyst can be used without affecting the polymerization adversely.

EXAMPLE 17

An initial variation of copolymerization reaction with passage of time was checked with the following recipe according to the manner as described in Example 8 using an ampule.

n-Hexane—600 parts
Styrene—25 parts
1,3-butadiene—75 parts (M=100)
n-Butyllithium—0.10 part (0.1 mmole)
Triethyl orthoacetate—variable
Polymerization temperature—40° C.
Polymerization time—variable The results are shown in the following Table 11.

TABLE 11

| Experiment No. | Amount of triethyl orthoacetate used | Polymerization time (minute) | Conversion (percent) | Microstructure, percent | | | Styrene content (percent) | Intrinsic viscosity (100 ml./grams) |
|---|---|---|---|---|---|---|---|---|
| | | | | Trans-1,4 | Vinyl | Cis-1,4 | | |
| 1 | 1.4 | 15 | 21.8 | 26.6 | 56.5 | 16.9 | 21.6 | 0.58 |
| 2 | 1.4 | 30 | 37.4 | 26.2 | 54.0 | 19.8 | 21.3 | 0.85 |
| 3 | 2.1 | 15 | 18.0 | 26.0 | 59.8 | 14.2 | 23.0 | 1.10 |
| 4 | 2.1 | 30 | 33.7 | 18.5 | 55.5 | 26.0 | 22.0 | 1.14 |

In this example, the distribution of randomness of styrene sequence of the copolymers obtained by copolymerizing by reducing the amount of n-butyllithium of the main catalyst used and under such a condition that a sufficiently high molecular weight polymer can be produced, was checked. The polymerization reaction was stopped in a low conversion, so that the intrinsic viscosity was not considerably high, but a copolymer having a high molecular weight can be obtained by further increasing the conversion.

It can be seen from the result of the above table that even in such a low concentration of the catalyst as desired commercially, a nearly completely random copolymer, wherein the distribution of styrene sequence is uniform, can be produced due to the randominizing effect of triethyl orthoacetate irrespective of the conversion.

EXAMPLE 18

A polymerization bottle having a capacity of 300 ml. was thoroughly dried and purged with nitrogen, and then fed with 400 parts of n-hexane, 25 parts of styrene and 75 parts of isoprene (M=600) under the nitrogen atmosphere, and to the resulting mixture were added 0.5 of triethyl orthoacetate and further 1.88 parts (1.8 mmole) of n-butyllithium, and then polymerization was effected at 40° C. for 2 hours. The yield of the obtained rubbery elastomer was 51.9% and the intrinsic viscosity was 0.65. Furthermore, the styrene content, which was measured from an absorbence ratio of a characteristic absorption at 1,370 cm.$^{-1}$ assigned to methyl group in isoprene unit and a characteristic absorption at 700 cm.$^{-1}$ assigned to phenyl group in styrene unit with an infrared spectrometer, was 26% (by weight).

For the comparison, when the experiment was carried out under the same condition as described above without using the orthoester, the yield was 12.5%, the intrinsic viscosity was 0.41 and the styrene content was 6.4%, so that it can be seen that the activity increases and randomness is improved by using triethyl orthoacetate.

EXAMPLE 19

This example shows the result of the experiment effected by using dilithium compound.

As the dilithium compound, tetraphenylethylene dilithium was used. Tetraphenylethylene dilithium was synthesized by mixing 20 ml. of benzene and 10 ml. of meta-dimethoxy benzene in an argon atmosphere under magnetic stirring, dissolving 0.01 mole of tetraphenylethylene therein, adding about 0.05 mole of a finely divided lithium metal thereto, and after reacted at 38° C. under stirring for 1 hour, removing an excess amount of the lithium metal. As a result of an acidimetry, the yield was 100%.

The polymerization reaction was carried out with 400 parts of n-hexane, 75 parts of 1,3-butadiene, 25 parts of styrene (M=600), 0.5 of triethyl orthoacetate and 4.2 mmole of a solution of tetraphenylethylene dilithium as synthesized above. The yield of the obtained rubbery elastomer was 94.1%, the intrinsic viscosity was 0.43 and the styrene content was 26%.

For the comparison, in the polymerization practised under the same conditions as described above without using triethyl orthoacetate, the yield was 41.0%, the intrinsic viscosity was 1.10 and the styrene content was 9.5%.

EXAMPLE 20

This example shows an experiment using phenyllithium as an organolithium.

The polymerization was carried out at 40° C. for 1 hour with 75 parts of 1,3-butadiene, 25 parts of styrene, 0.5 of triethyl orthoacetate and 400 parts of n-hexane (M=100). The yield of the obtained rubbery elastomer was 29.9%, the styrene content was 19.2%, and the microstructure in the butadiene unit was trans-1,4 of 23.1%, vinyl of 51.0% and cis-1,4 of 25.9%.

In the experiment effected under the same conditions as described above without using triethyl orthoacetate, the yield was 11.8%, the styrene content was 8.3%, and the microstructure in the butadiene unit was trans-1,4 of 46.5%, vinyl of 18.4% and cis-1,4 of 35.1%.

EXAMPLE 21

A synthesis experiment was carried out with the following recipe in the same manner as described in Example 1.

Polymerization recipe:
    1,3-butadiene—75 part
    Styrene—25 parts (M=40,660)
    N-hexane—400 parts
    N-butyllithium—24.4 mmole
    Triethyl orthoacetate—0.5 (12.2 mmole)
    Polymerization temperature—40° C.
    Polymerization time—9 hours The characteristics of the obtained copolymer are shown in the following table:

Yield (percent) _____ 98.9
Styrene content (percent) _____ 24.9
Microstructure (percent):
    Trans-1,4 _____ 30.8
    Vinyl _____ 44.7
    Cis-1,4 _____ 24.5
Intrinsic viscosity (dl./g.) _____ 3.06
Recovering percentage measured by an oxidative degradation method (percent) _____ 0
Glass transition temperature (° C.) _____ −41
Mooney viscosity (100° C.) _____ 102.5

In order to examine physical properties of the thus obtained copolymer, the following recipe and cure condition were used.

Recipe:
    Copolymer—100 parts
    Aromatic oil [1]—50 parts
    ISAF black—75 parts
    Antioxidant [2]—1 part
    Stearic acid—2 parts
    Zinc white—5 parts
    Sulfur—1.5 parts
    Accelerator [3]—1.5 parts
    Mooney viscosity at 130° C.—82
    Mooney scorch time at 130° C.—8.0 minutes

[1] Aromatic oil (Japanese Synthetic Rubber Co. Ltd.).
[2] Phenyl-β-naphthylamine.
[3] Cyclohexyl-benzothiazylsulfenamide.

Cure condition:
  Temperature—145° C.
  Time—30 minutes

As the results of the measurement, the physical properties are shown in the following table.
Physical properties of vulcanized copolymer:

| | |
|---|---|
| Hardness (°)[1] | 55 |
| Elongation (percent)[2] | 550 |
| Tensile strength (kg./cm.$^2$)[3] | 260 |
| 100% modulus[4] | 18 |
| 300% modulus[5] | 104 |
| Resilience (percent)[6]: | |
| At room temperature | 38.8 |
| At 40° C. | 44.2 |
| At 80° C. | 52.5 |
| At 120° C | 59.1 |
| Wet skid resistance[7] | |
| For flat concrete (index) | 64 |
| For coarse asphalt concrete (index) | 39 |
| Lambourn type abrasion (cc./min.)×10$^{-3}$ | 55 |

[1] JIS K6301.
[2] JIS K6301.
[3] JIS K6301.
[4] JIS K6301.
[5] JIS K6301.
[6] BS 903.
[7] Rub. Chem. and Technol., 38, 112 (1965).

Styrene-butadiene copolymers prepared with a catalyst consisting of an organolithium compound and an orthoester, are relatively excellent in randomness and have physical properties suitable for the use of applications as a rubber even if the copolymers have a structure containing a large amount of vinyl content, and further excellent physical properties equal to or more than those of commercially available styrene-butadiene copolymers can be expected, if the optimum conditions are selected.

What is claimed is:

1. A process for preparing copolymers which comprises contacting a monomeric mixture of (1) a conjugated diene containing from 4 to 12 carbon atoms and (2) a vinyl-substituted aromatic hydrocarbon, at a temperature in the range of −80° to 150° C. in the presence of a substantially anhydrous liquid hydrocarbon diluent having less than 20 carbon atoms, with a catalyst consisting essentially of (1) an organolithium compound having the formula R$^1$(Li)$_x$, wherein R$^1$ is selected from the group consisting of alkyl, alkenyl, cycloalkyl, aryl, alkaryl and aralkyl radicals containing from 1 to 30 carbon atoms and $x$ is an integer from 1 to 4 and, (2) an orthoester having the formula

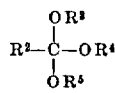

wherein R$^2$ is selected from the group consisting of hydrogen, alkyl, alkenyl, cycloalkyl, aryl, alkaryl and aralkyl radicals containing from 1 to 20 carbon atoms and R$^3$, R$^4$ and R$^5$ are selected from the group consisting of alkyl, alkenyl and aralkyl radicals containing from 1 to 20 carbon atoms, the amount of said organolithium compound being in the range of 0.01 to 10 millimoles per mole of said monomeric mixture and the mole ratio of said orthoester to said organolithium compound being in the range of 0.01 to 20.

2. A process according to claim 1, wherein said conjugated diene is 1,3-butadiene and said vinyl-substituted aromatic hydrocarbon is styrene.

3. A process according to claim 1, wherein said conjugated diene is isoprene and vinyl-substituted aromatic hydrocarbon is styrene.

4. The method according to claim 1, wherein said organolithium compound is an alkyllithium, the alkyl of which has 2 to 8 carbon atoms.

5. The method according to claim 1, wherein said orthoester is an orthoester having the general formula

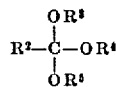

wherein R$^2$ is a member selected from the group consisting of hydrogen, an alkyl group having 1 to 6 carbon atoms, phenyl group and benzyl group and R$^3$, R$^4$ and R$^5$ are alkyl groups having 1 to 10 carbon atoms.

6. A process according to claim 1, wherein said catalyst consists essentially of n-butyllithium and trimethyl orthoformate.

7. A process according to claim 1, wherein said catalyst consists essentially of n-butyllithium and triethyl orthoformate.

8. A process according to claim 1, wherein said catalyst consists essentially of n-butyllithium and triethyl orthoacetate.

9. A process according to claim 1, wherein said catalyst consists essentially of n-butyllithium and triethyl orthobutyrate.

10. A process according to claim 1, wherein said catalyst consists essentially of n-butyllithium and triethyl orthovalerate.

11. A process according to claim 1, wherein said catalyst consists essentially of n-butyllithium and triethyl orthopropionate.

12. A process according to claim 1, wherein said catalyst consists essentially of n-butyllithium and triethyl orthobenzoate.

13. A process according to claim 1, wherein said catalyst consists essentially of n-butyllithium and triethyl orthophenylacetate.

14. A process according to claim 1, wherein said catalyst consists essentially of n-butyllithium and tri-n-butyl orthoformate.

15. A process according to claim 1, wherein said catalyst consists essentially of n-butyllithium and tripentyl orthoformate.

16. A process according to claim 1, wherein said catalyst consists essentially of n-butyllithium and tridecyl orthoformate.

17. A process according to claim 1, wherein said catalyst consists essentially of n-butyllithium and trimethyl orthoacetate.

18. A process according to claim 1, wherein said catalyst consists essentially of phenyllithium and triethyl orthoacetate.

19. A process according to claim 1, wherein said catalyst consists essentially of tetraphenyl ethylenelithium and triethyl orthoacetate.

20. A process according to claim 1, wherein the mole ratio of said orthoester to said organolithium compound is in the range of 0.02 to 10.

21. A process for preparing copolymers which comprises contacting a monomeric mixture of a monomer selected from the group consisting of 1,3-butadiene and isoprene with styrene, at a temperature in the range of 0 to 100° C. in the presence of a substantially anhydrous liquid aliphatic hydrocarbon diluent having 4 to 10 carbon atoms, with a catalyst prepared by mixing materials consisting essentially of alkyllithium, wherein said alkyl group has 2 to 8 carbon atoms and an orthoester having the formula

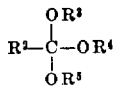

wherein $R^2$ is selected from the group consisting of hydrogen, alkyl having 1 to 6 carbon atoms, phenyl and benzyl radicals and $R^3$, $R^4$ and $R^5$ are selected from the group consisting of alkyl radicals containing from 1 to 10 carbon atoms, the amount of alkyllithium being in the range of 0.01 to 10 millimoles per mole of said monomeric mixture and the mole ratio of said orthoester to alkyllithium being in the range of 0.02 to 10.

References Cited

UNITED STATES PATENTS 3,254,062  5/1966  Forman _____ 260—83.7

JAMES A. SEIDLECK, Primary Examiner

U.S. Cl. X.R.

252—431; 260—94.2